(12) United States Patent  (10) Patent No.: US 7,937,429 B2
Lu  (45) Date of Patent: May 3, 2011

(54) TAYLOR SERIES-BASED TRANSMISSION LINE EQUALIZATION SCHEME

(75) Inventor: Yu-Lun Richard Lu, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 917 days.

(21) Appl. No.: 11/897,098

(22) Filed: Aug. 28, 2007

(65) Prior Publication Data

US 2008/0086521 A1 Apr. 10, 2008

Related U.S. Application Data

(60) Provisional application No. 60/828,371, filed on Oct. 5, 2006.

(51) Int. Cl.
*G06G 7/02* (2006.01)
(52) U.S. Cl. .......................................... 708/819
(58) Field of Classification Search .................. 708/819
See application file for complete search history.

(56) References Cited

U.S. PATENT DOCUMENTS 3,265,870 A * 8/1966 Bose .............................. 708/819

OTHER PUBLICATIONS

Intersil: EL9110; Data Sheet: FN7305.4: Jul. 15, 2005; pp. 1-8.
IEEE International Solid-State Circuits Conference: Digest of Technical Papers: Paper WP 23.3: Session 23: Feb. 17, 1999: 4 pgs.
IEEE International Solid-State Circuits Conference: "Low-Power & Communication Signal Processing": Digest of Technical Papers: Paper FA 10.7: Session 10: Feb. 9, 1996: pp. 174-175, 439.

* cited by examiner

*Primary Examiner* — Tan V Mai
(74) *Attorney, Agent, or Firm* — Koppel, Patrick, Heybl & Dawson

(57) ABSTRACT

An equalization scheme for a transmission line employs a Taylor series expansion which enables the provided equalization to be adjusted based on line length. Multiple circuit blocks compute respective terms of the Taylor series, which are then summed to provide a compensating frequency response. For example, for a conductor having a frequency response given by $H(f)=e^{-kl(1+j)\sqrt{f}}$, where k is a constant dependent on the physical parameters of the conductor, l is the length of the conductor and f is the frequency of the signal propagated via the conductor, the present scheme provides an inverse frequency response $H^{-1}(f)$ given by $H^{-1}(f)=$ $$1 + \frac{kl\sqrt{f}}{1!} + \frac{k^2 l^2 f}{2!} + \frac{k^3 l^3 f^2}{3!} + \ldots$$

The kl terms serve as weighting factors which vary with the length of the conductor.

18 Claims, 8 Drawing Sheets

TAYLOR SERIES-BASED TRANSMISSION LINE EQUALIZATION SCHEME

RELATED APPLICATIONS

This application claims the benefit of provisional patent application No. 60/828,371 to Lu, filed Oct. 5, 2006.

BACKGROUND OF THE INVENTION

1. Field of the Invention

This invention relates generally to transmission line equalization schemes, and more particularly to an equalization scheme based on a Taylor series expansion.

2. Description of the Related Art

A transmission line has an associated frequency response which affects the quality of an input signal propagated on the line. For example, the "skin effect" causes a conductor to have an impedance which increases by the square-root of frequency, which causes an attenuation of the propagated signal at the receiving end of the line.

One method of addressing adverse effects that might arise as a result of a transmission line's frequency response is to receive the propagated signal with a receiver having a frequency response which is the inverse of that of the transmission line, to provide "equalization"—i.e., to restore the magnitude fidelity of the input signal. This approach is described, for example, in A. J. Baker, "An Adaptive Cable Equalizer for Serial Digital Video Rates to 400 Mb/s", ISSCC 1996 and M. H Shakiba, "A 2.5 Gb/s Adaptive Cable Equalizer", ISSCC 1999. This approach processes a signal received via a transmission line having a known length with a circuit block having a DC gain of 1, along with multiple frequency-dependent blocks, the outputs of which are summed to provide equalization. Generally, equalization schemes have been implemented digitally; the absolute accuracy of the equalization schemes provided by digital equalizers is often poor, as the accuracy of a digital equalizer is typically considered to be relatively unimportant.

SUMMARY OF THE INVENTION

An equalization scheme for a transmission line employing a Taylor series expansion is presented, which enables the provided equalization to be adjusted based on line length.

The frequency response of a conductor is typically given by $H(f)=e^{-kl(1+j)\sqrt{f}}$, where k is a constant dependent on the physical parameters of the conductor, l is the length of the conductor and f is the frequency of the signal propagated via the conductor. In this case, the compensating frequency response is given by:

$$H^{-1}(f) = 1 + \frac{kl\sqrt{f}}{1!} + \frac{k^2l^2f}{2!} + \frac{k^3l^3f^2}{3!} + \dots$$

The kl terms in this $H^{-1}(f)$ expression serve as weighting factors which vary with the length of the conductor. Using the Taylor series expansion as the basis for the equalization, along with the use of weighting factors that adjust the equalization for varying line lengths, result in equalization that is generally more accurate than that provided by prior art schemes. The present scheme is particularly well-suited to use with analog equalizers, the absolute accuracy of which are greatly improved when using the described method.

These and other features, aspects, and advantages of the present invention will become better understood with reference to the following drawings, description, and claims.

DETAILED DESCRIPTION OF THE INVENTION

It is known from transmission line theory that the impedance of a good conductor increases by the square root of frequency due to the skin effect. The equation describing the frequency response of a good conductor is given by:

$$H(f)=e^{-kl(1+j)\sqrt{f}} \qquad (1)$$

where k is a constant dependent on the physical parameters of the conductor, l is the length of the conductor, and f is the frequency of the signal. Therefore, to provide equalization which restores the magnitude fidelity of the input signal, a system with a frequency response equal to $|H^{-1}(f)|=e^{-kl(1+j)\sqrt{f}}|$ is needed.

Here, $|H^{-1}(f)|$ is obtained by using the Taylor series expansion for an exponential:

$$e^x = 1 + \frac{x}{1!} + \frac{x^2}{2!} + \frac{x^3}{3!} + \dots \qquad (2)$$

This equation is an infinite series, and the concept presented herein can be extended to include any number of terms, depending on the level of accuracy needed. The first three terms are generally sufficient for a typical application. Expanding equation 1 using equation 2 results in the following (first three terms only):

$$|H^{-1}(f)| = 1 + \frac{kl\sqrt{f}}{1!} + \frac{k^2l^2f}{2!} \quad (3)$$

Equation 3 shows a first term ("1") which is constant with frequency, a second term $(kl\sqrt{f})$ which is proportional to the square root of f, and a third term $$\left(\frac{k^2l^2f}{2}\right)$$

which is proportional to f. Inverse frequency response $|H^{-1}(f)|$ will be dominated by one of the three terms, depending on the frequency. From equation 3 it is seen that, for accurate compensation at different conductor lengths, all terms of the Taylor expansion higher than the first (constant) term should be multiplied by a weighting factor that varies with conductor length. Here, the weighting factors for the second and third terms are proportional to kl and $k^2l^2$, and thus vary with the length l of the conductor. By using the Taylor series expansion as the basis for the equalization, and then explicitly separating the terms of equation 3 and multiplying them by different weighting factors that vary with line length, highly accurate equalization can be achieved.

Figure 1:
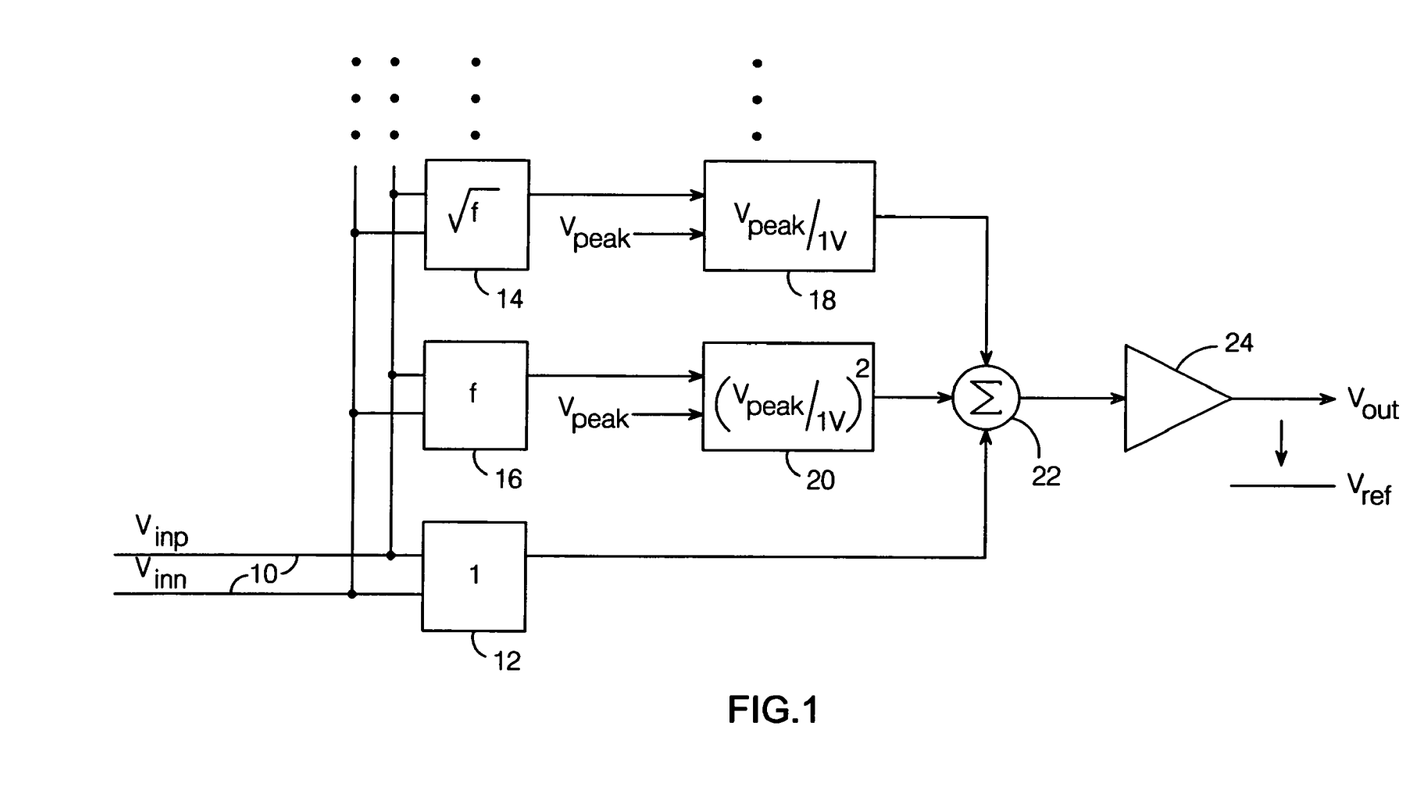
FIG. 1 is block diagram illustrating the basic principles of a Taylor series-based transmission line equalization scheme per the present invention.

FIG. 1 is block diagram illustrating the basic principles of a Taylor series-based transmission line equalization scheme per the present invention. A differential input signal 10 received at inputs $V_{inp}$ and $V_{inn}$ is applied to multiple "frequency modules" (12, 14, 16) which are arranged to calculate the frequency components of respective terms of the Taylor series expansion. Here, frequency module 12 provides the first term of the series (constant with frequency), frequency module 14 provides the second term ($\sqrt{f}$), and frequency module 16 provides the third term (f).

The outputs of frequency modules 14 and 16 are provided to "weighting factor" modules 18 and 20, respectively, which serve to multiply a received frequency component with a weighting factor that varies with conductor length. As noted above, the weighting factors for the second and third terms of the Taylor series expansion are proportional to kl and $k^2l^2$; these values are represented in FIG. 1 as $V_{peak}/1V$ and $(V_{peak}/1V)^2$, respectively, where $V_{peak}/1V$ corresponds linearly with line length and is preferably (though not necessarily) normalized to 1 volt.

The outputs of modules 12, 18 and 20 are summed with a summing circuit 22, and then preferably buffered with an amplifier 24 and outputted as a single-ended voltage $V_{out}$. In this exemplary embodiment, $V_{out}$ is referred to a reference voltage $V_{ref}$, discussed below.

The Taylor series expansion shown in equation 3 can be realized with a frequency response H(s) equal to:

$$H(s) = \left(\frac{1}{R_0} + A\left[\frac{sC_1}{1+sC_1R_1} + \frac{sC_2}{1+sC_2R_2} + \ldots + \frac{sC_n}{1+sR_nC_n}\right] + A^2\left[\frac{sC_x}{1+R_xC_x}\right]\right)R_s, \quad (4)$$

in which the first, second and third terms within the parentheses correspond to the constant-with-frequency, the $\sqrt{f}$, and the f terms of equation 3, respectively, with 'A' varying with conductor length, and $s=j2\pi f$.

As explained in more detail below, H(s) is formed by (1) applying the input signal voltage across the impedances defined by the right side of equation 4 to form currents with the needed frequency characteristics, (2) developing the proper "weighting" of those currents by taking the needed portion of each current based on the value of $V_{peak}$, which varies with conductor length, (3) summing the weighted currents, and (4) converting the summed currents to a voltage, typically by running the summed currents through a resistor having value $R_s$.

Figure 2A:
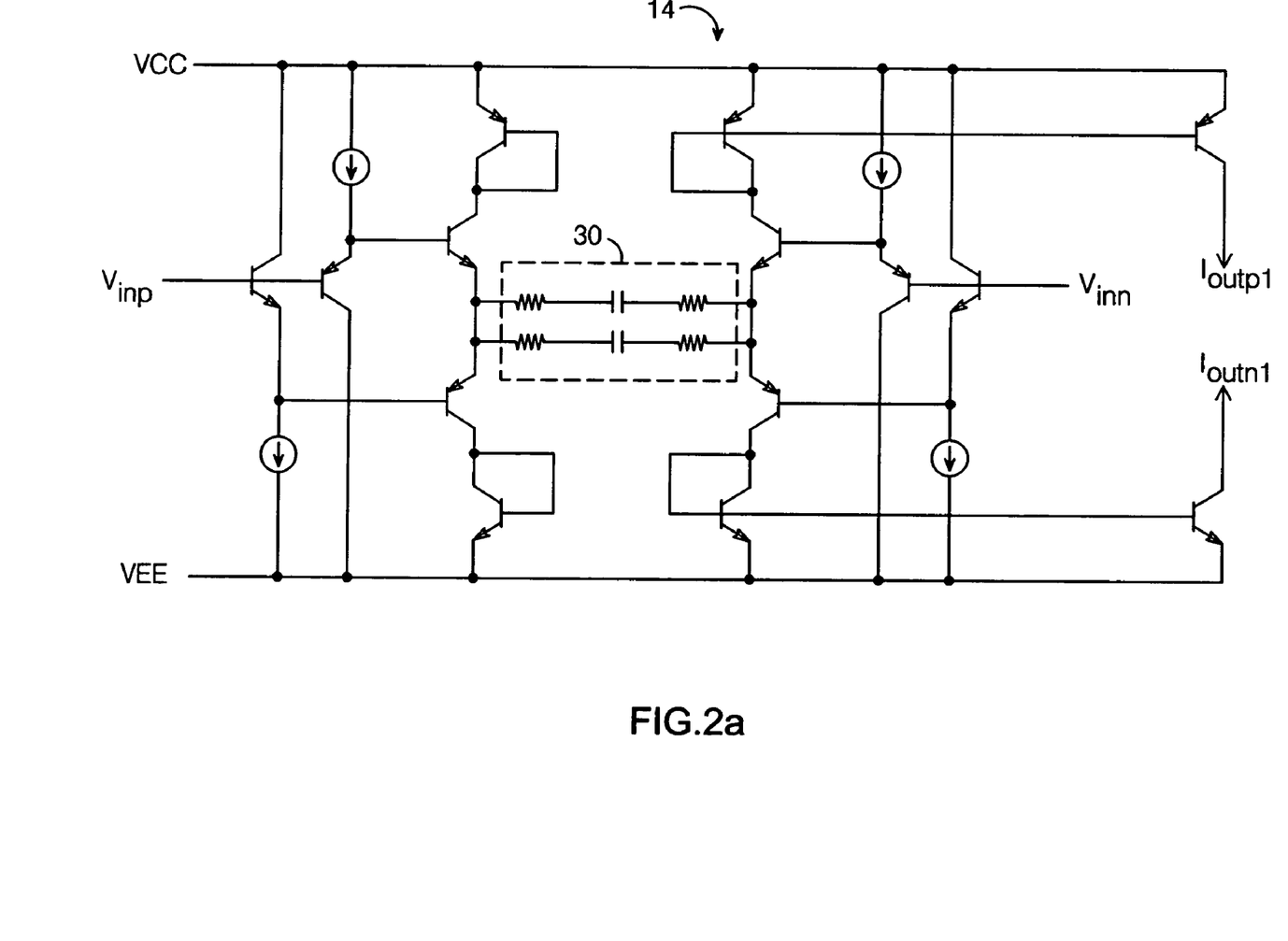
FIG. 2a is a schematic diagram of a frequency dependent input stage which implements the frequency component of the second term in a Taylor series expansion as described herein.

Here, the $\sqrt{f}$ term (corresponding to frequency module 14) is approximated with a piece-wise linear sum of n zero-pole pairs. One possible way of implementing frequency module 14 is shown in FIG. 2a, which depicts the use of an "H-bridge" topology with a frequency-dependent impedance. The input signal is applied at inputs $V_{inp}$ and $V_{inn}$, is buffered, and connected across multiple series resistor-capacitor impedances 30 connected in parallel to approximate the square-root of frequency term in equation 3. In this example, there are two series R-C pairs, so that the middle term of equation 4 above is implemented with n=2. The module produces a differential output current that varies approximately with the square root of frequency at $I_{outp1}$ and $I_{outn1}$.

Figure 2B:
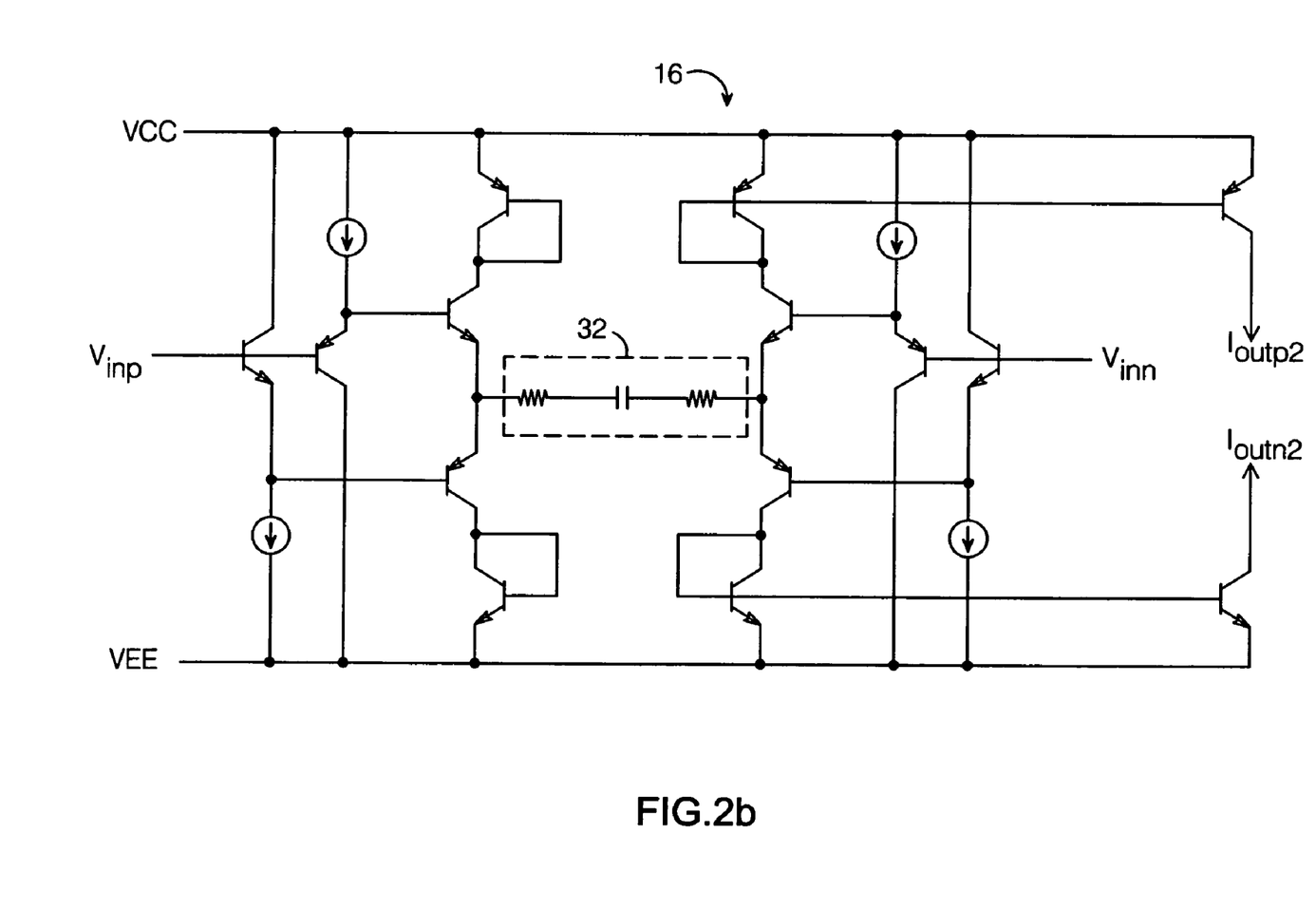
FIG. 2b is a schematic diagram of a frequency dependent input stage which implements the frequency component of the third term in a Taylor series expansion as described herein.

Frequency module 16 may be similarly implemented; one possible embodiment is shown in FIG. 2b. This module also includes a frequency-dependent impedance 32. Here, the module is arranged to produce a differential current at $I_{outp2}$ and $I_{outn2}$ that varies linearly with frequency; this can be provided with a single series R-C network providing a single zero-pole pair. Only a capacitor is needed to implement the linear increase with frequency; however, a resistor is preferably connected in series to limit the high frequency gain and integrated noise.

Figure 2C:
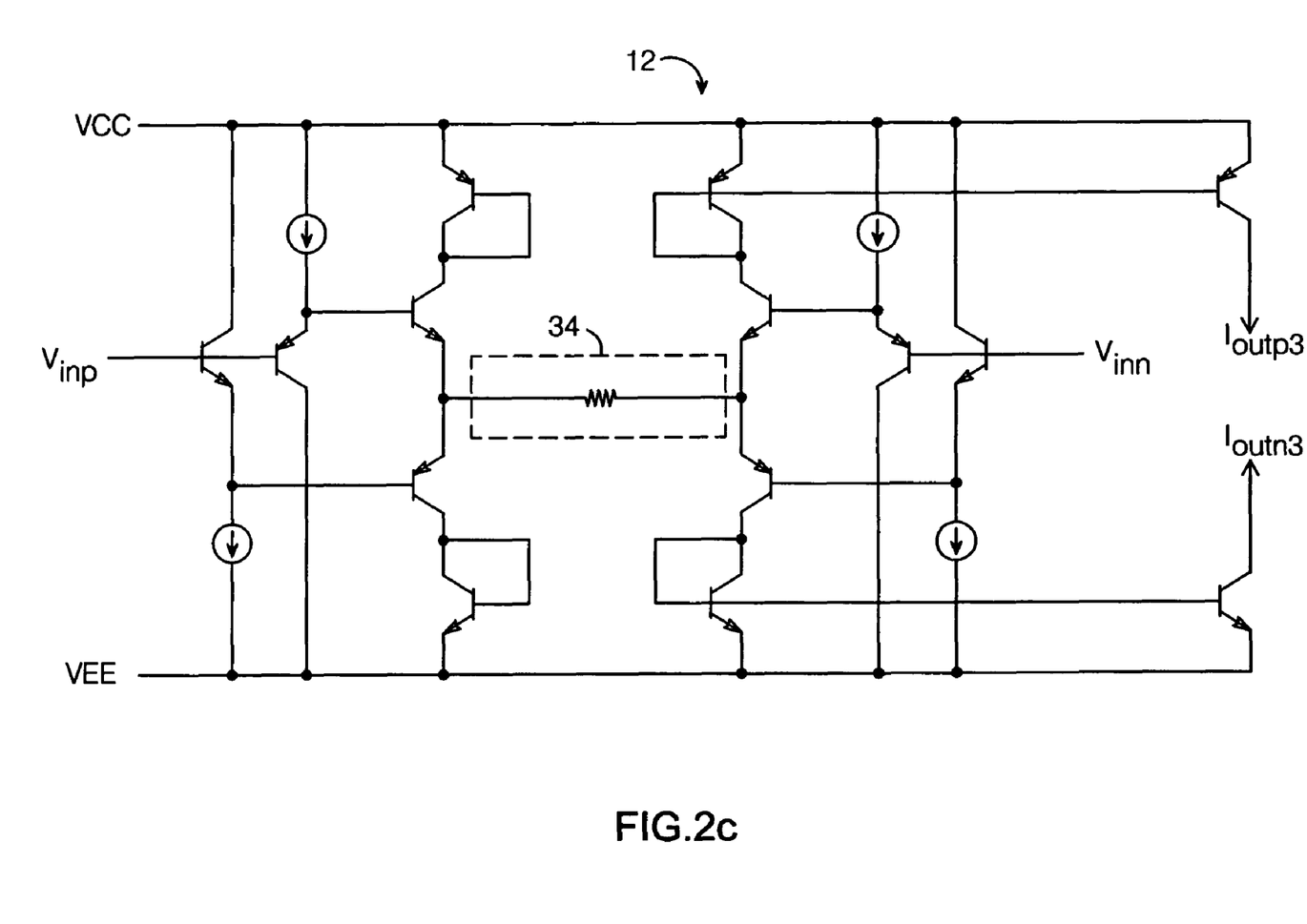
FIG. 2c is a schematic diagram of an input stage which implements the first term in a Taylor series expansion as described herein.

One possible embodiment of frequency module 12 is shown in FIG. 2c. This module needs to be constant with frequency, and thus its impedance 34 requires only a resistance. When so arranged, module 12 produces a differential current at $I_{outp3}$ and $I_{outn3}$ that is constant with frequency.

In practice, the RC product in the third (linear) term is much smaller than the RC products in the second (square root) term, so the pole that levels out the decrease in impedance affects the response at a much higher frequency. In a typical frequency range of interest, the third term can be treated as just linear (sC). The series resistance for module 16 is the sum of the two resistors connected in series with the capacitor, which is typically quite small relative to the resistors in FIG. 2a.

Figure 3:
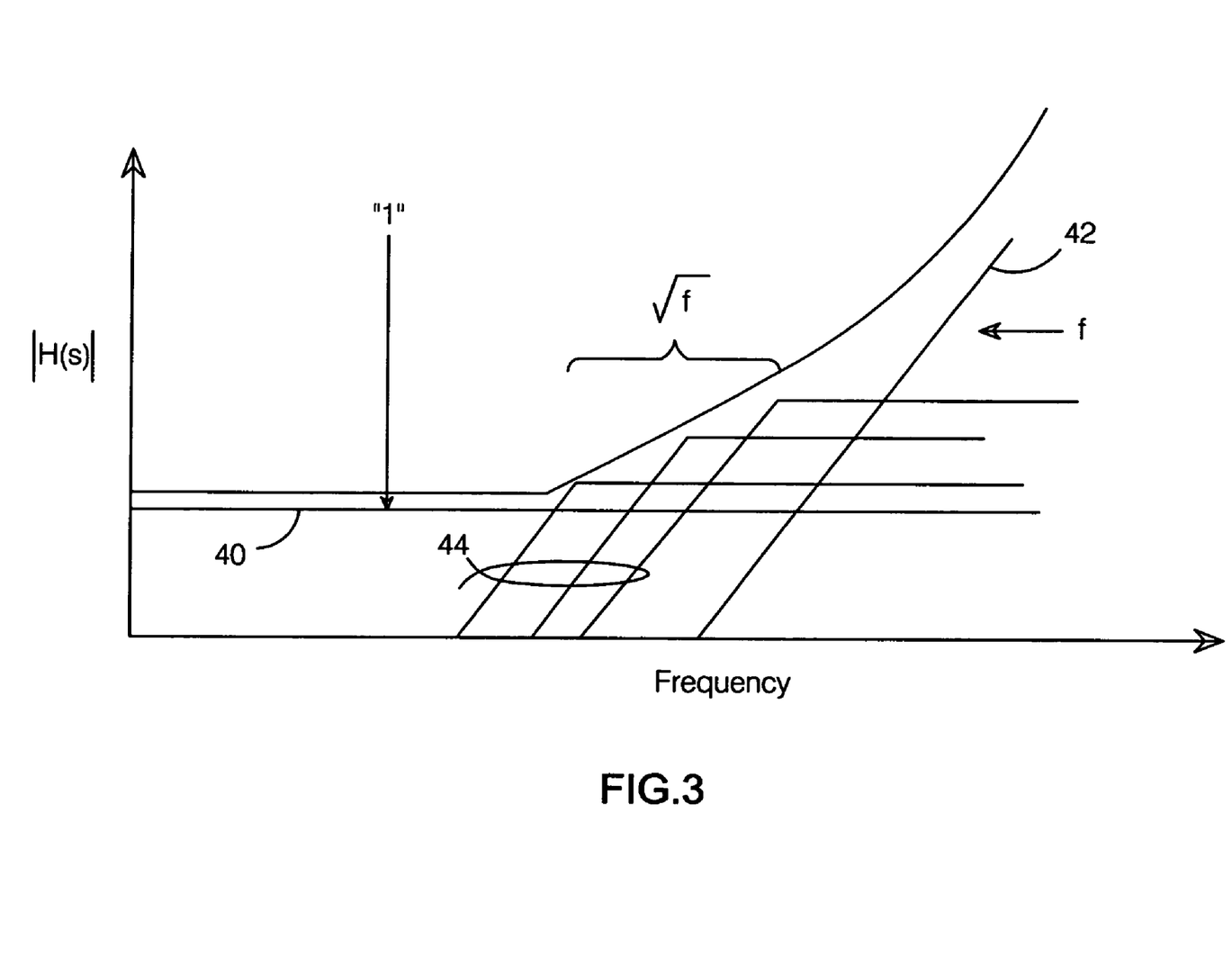
FIG. 3 is a plot of the frequency responses of various frequency modules per the present invention.

A plot illustrating the contributions of the frequency modules 12, 14 and 16 to frequency response H(s) is shown in FIG. 3. Included are trace 40 (module 12)—constant with frequency, trace 42 (module 16)—linear with frequency, and the three terms (44) that provide a response that varies with $\sqrt{f}$ (module 14).

The differential output currents of frequency modules 14 and 16 are provided to weighting factor modules 18 and 20, respectively, which multiply the incoming currents by respective weighting factors as discussed above. The weighting factor modules are preferably mixer circuits that steer the differential currents in response to control voltage $V_{peak}$, which varies linearly with line length.

Control voltage $V_{peak}$ is typically a user-provided value. For example, the present equalization system could be arranged such that line lengths of 25, 50, 75 and 100 meters have corresponding $V_{peak}$ values of 0.25, 0.5, 0.75 and 1.0 volts. When so arranged, the present scheme can provide equalization which is accurate at any line length, just by changing the value of $V_{peak}$.

Figure 4A:
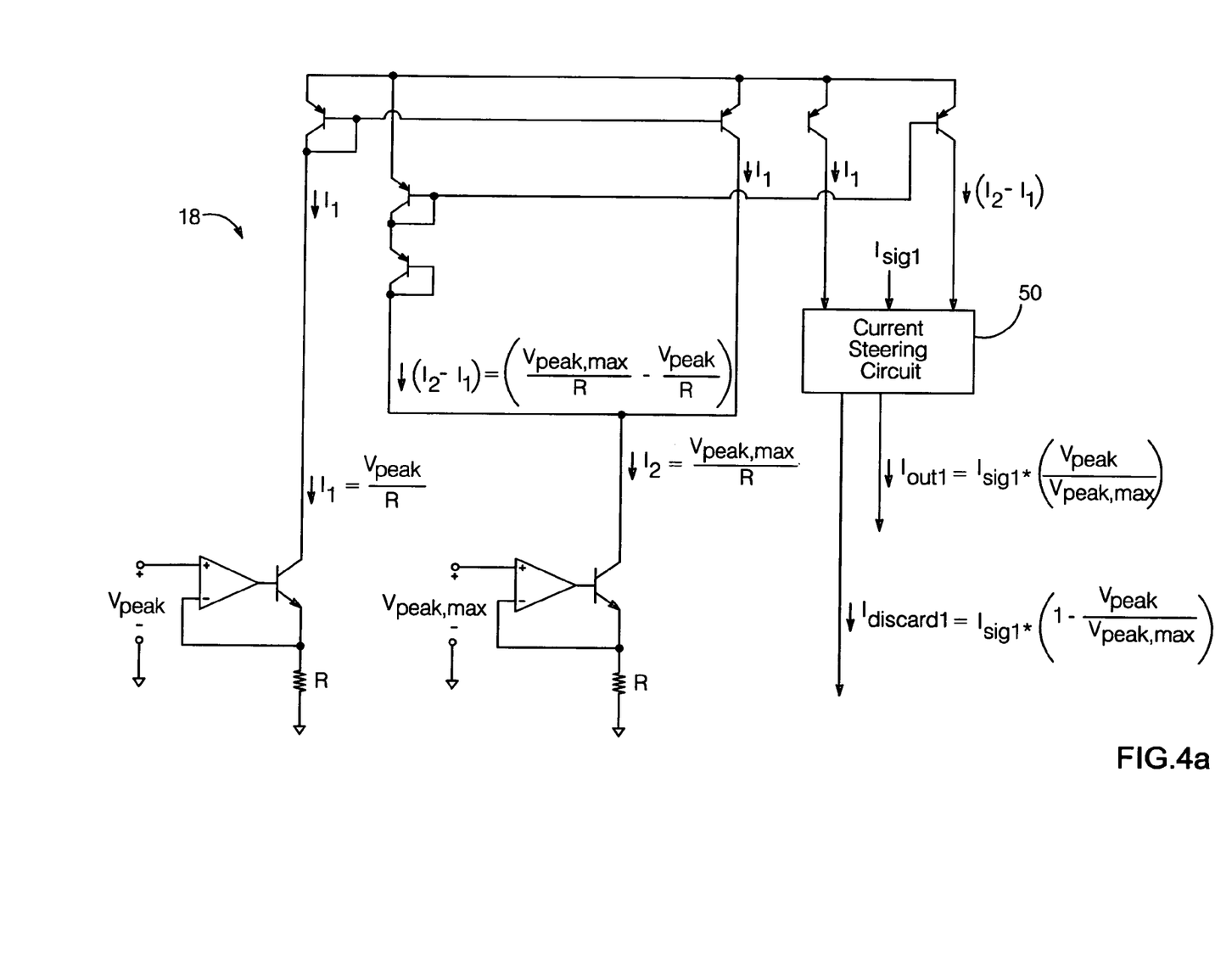
FIG. 4a is a schematic diagram of a mixer circuit which implements the weighting factor component of the second term in a Taylor series expansion as described herein.

One possible implementation of weighting factor module 18 is shown in FIG. 4a. Control voltage $V_{peak}$ is placed across a resistor R in order to generate a current $I_1=V_{peak}/R$. The normalization to 1V is implemented by applying a voltage $V_{peak,max}$ of 1V across another resistor R to produce a current $I_2=V_{peak,max}/R$. When so arranged, the maximum output occurs when the input signal equals the output signal; i.e., when $V_{peak}=V_{peak,max}=1V$. The module is arranged such that $I_1$ is subtracted from $I_2$ to give:

$$I_2 - I_1 = \frac{V_{peak,max}}{R} - \frac{V_{peak}}{R} = \frac{V_{peak,max}}{R}\left(1 - \frac{V_{peak}}{V_{peak,max}}\right).$$

Difference current $I_2-I_1$, a copy of current $I_1$, and a current $I_{sig1}$ given by $I_{outp1}-I_{outn1}$ are fed into a current steering circuit block 50, which determines from the ratio of $I_2-I_1$ to $I_1$ how much input current to steer to the output $I_{out1}$, and how much to discard ($I_{discard1}$). As shown in FIG. 4a, $I_{out1}$ is given by:

$$I_{out1} = I_{sig}\left(\frac{V_{peak}}{V_{peak,max}}\right),$$

and $I_{discard}$ is given by:

$$I_{discard} = I_{sig}\left(1 - \frac{V_{peak}}{V_{peak,max}}\right).$$

Figure 4B:
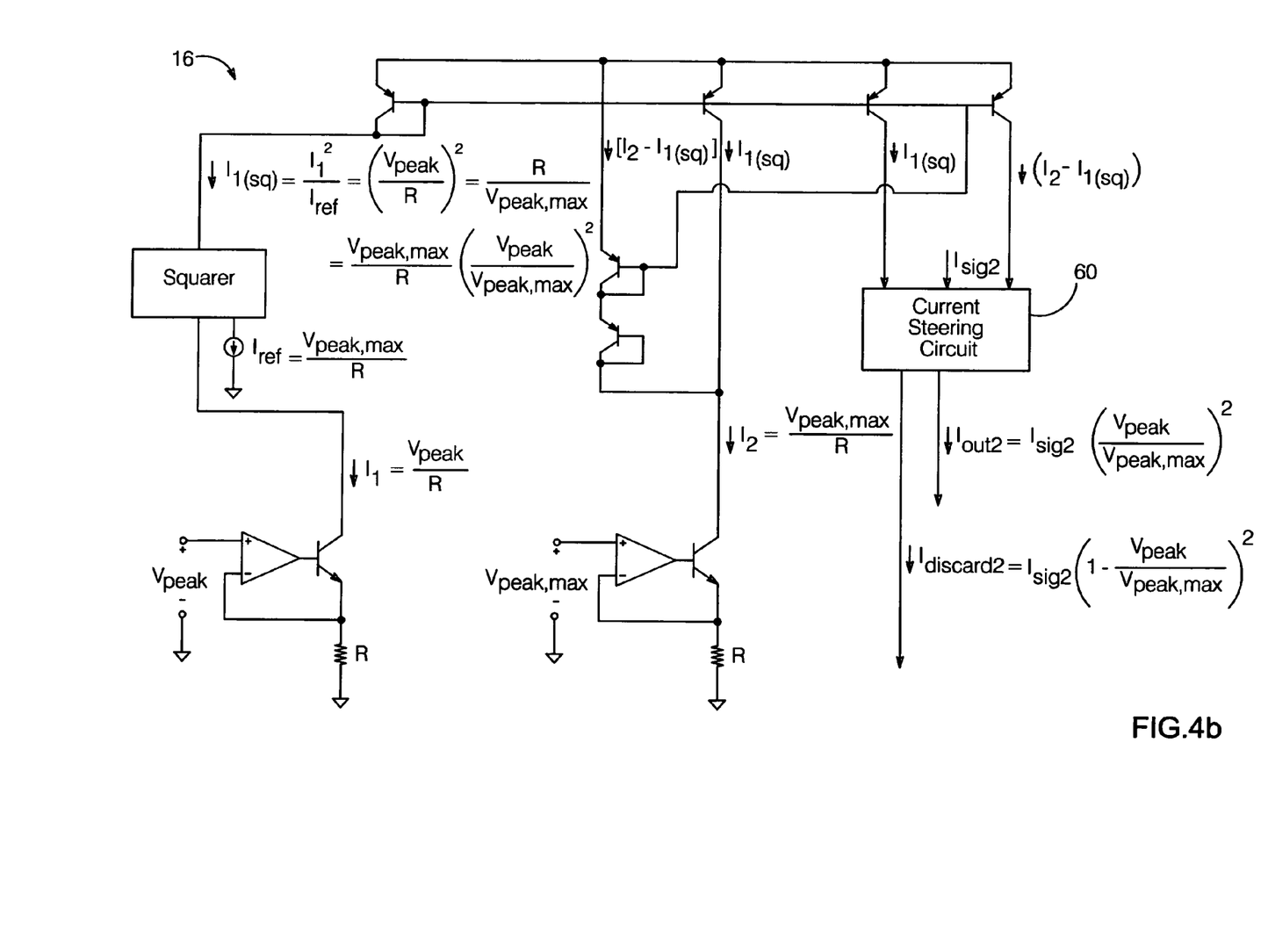
FIG. 4b is a schematic diagram of a mixer circuit which implements the weighting factor component of the third term in a Taylor series expansion as described herein.

A possible implementation of weighting factor module 16 is shown in FIG. 4b. This is similar to module 18, except that current $I_1=V_{peak}/R$ is conducted through a squarer circuit 54 which also receives a reference current $I_{ref}(=V_{peak,max}/R)$, to produce a current $I_1(sq)$, given by:

$$I_{1(sq)} = \frac{I_1^2}{I_{ref}} = \left(\frac{V_{peak}}{R}\right)^2 * \frac{R}{V_{peak,max}} = \frac{V_{peak,max}}{R}\left(\frac{V_{peak}}{V_{peak,max}}\right)^2.$$

Current $I_2=V_{peak,max}/R$ is generated as in FIG. 4a. The module is arranged such that $I_1(sq)$ is subtracted from $I_2$ to give:

$$I_2 - I_{1(sq)} =$$
$$\frac{V_{peak,max}}{R} - \frac{V_{peak,max}}{R}\left(\frac{V_{peak}}{V_{peak,max}}\right)^2 = \frac{V_{peak,max}}{R}\left(1 - \left[\frac{V_{peak}}{V_{peak,max}}\right]^2\right).$$

Difference current $I_2-I_1(sq)$, a copy of current $I_1(sq)$, and a current $I_{sig2}$ given by $I_{outp2}-I_{outn2}$ are fed into a current steering circuit block 60, which determines from the ratio of $I_2-I_1(sq)$ to $I_1(sq)$ how much input current to steer to the output $I_{out2}$, and how much to discard ($I_{discard2}$). As shown in FIG. 4b, $I_{out2}$ is given by:

$$I_{out2} = I_{sig2}\left(\frac{V_{peak}}{V_{peak,max}}\right)^2,$$

and $I_{discard2}$ is given by:

$$I_{discard2} = I_{sig2}\left(1 - \left[\frac{V_{peak}}{V_{peak,max}}\right]^2\right).$$

Figure 4C:
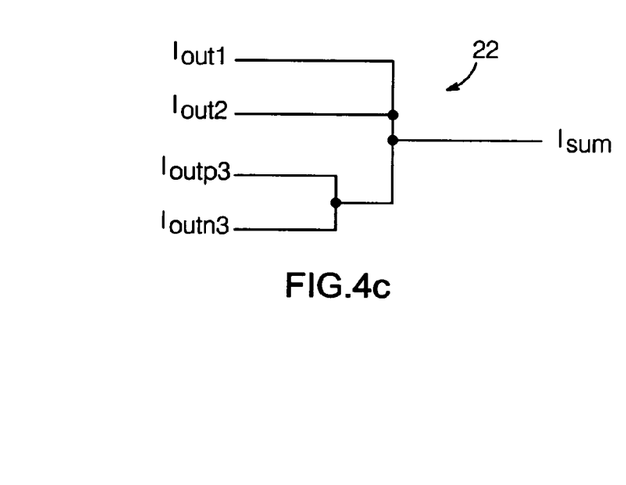
FIG. 4c is a simplified schematic diagram of a summing circuit as might be used by an equalization scheme per the present invention.

As shown in FIG. 1, the outputs of weighting factor modules 16 and 18 and frequency module 12 are summed together with a summing circuit 22. One possible implementation of summing circuit 22 is shown with the simplified schematic of FIG. 4c, which sums outputs $I_{out1}$ and $I_{out2}$ from weighting factor modules 16 and 18, with currents $I_{outp3}$ and $I_{outn3}$ produced by frequency module 12, to produce $I_{sum}$.

Figure 5:
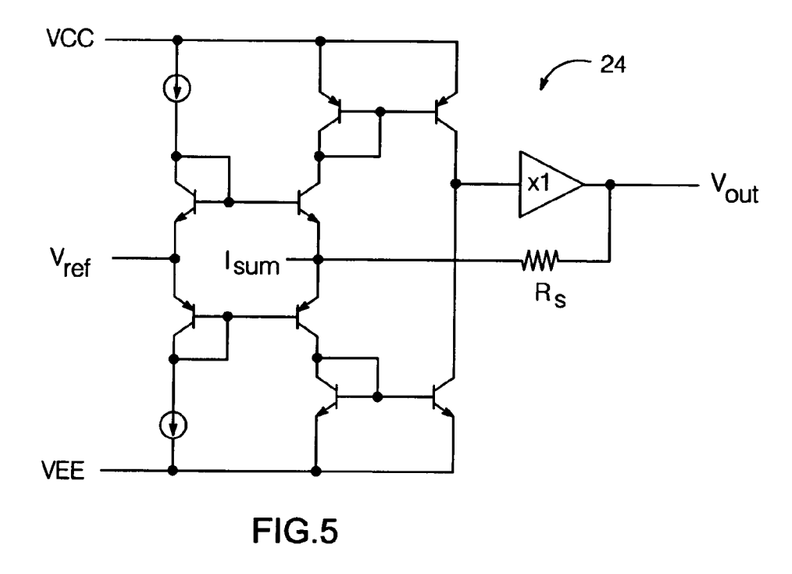
FIG. 5 is a schematic diagram of an amplifier which buffers the summed currents resulting from the calculation of the terms of a Taylor series expansion as described herein.

The summed currents ($I_{sum}$) are provided to a buffer amplifier 24, for conversion to a voltage as mentioned above. Amplifier 24 is preferably a current feedback amplifier, though other amplifier types could also be used. One possible embodiment of such an amplifier is shown in FIG. 5. $I_{sum}$ and a reference voltage $V_{ref}$ are received at respective inputs, and the amplifier produces an output voltage $V_{out}$ with respect to $V_{ref}$; $V_{out}$ is the equalized version of an input signal received via a conductor of length l at $V_{inp}$ and $V_{inn}$. Resistance $R_s$ corresponds to the resistance $R_s$ found in equation 4.

The present equalization scheme is suitably employed as part of an analog equalizer. However, the present scheme could possibly improve the bit error rate of a digital equalizer as well.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A system which provides a compensating frequency response for a conductor having a frequency response H(f) given by $H(f)=e^{-kl(1+j)\sqrt{f}}$, comprising:
    circuitry arranged to receive a signal propagated via said conductor and to compute the terms of a Taylor series expansion of $$H^{-1}(f) = 1 + \frac{kl\sqrt{f}}{1!} + \frac{k^2l^2f}{2!} + \frac{k^3l^3f^2}{3!} + \ldots,$$

where k is a constant dependent on the physical parameters of said conductor, l is the length of said conductor and f is the frequency of the signal propagated via said conductor, and
    a summing circuit which sums together said terms so as to provide said compensating frequency response.

2. The system of claim 1, further comprising a buffer amplifier which receives said summed terms and produces a single-ended voltage output.

3. The system of claim 1, wherein said circuitry comprises:
    a plurality of frequency modules, each of which provides an output representative of the frequency component of a respective term of said Taylor series expansion; and
    a plurality of weighting factor modules coupled to the outputs of respective frequency modules for terms higher than said first term, each of said weighting factor modules arranged to multiply the output of its respective frequency module by a weighting factor which varies with the kl component of the Taylor series expansion term associated with said frequency module,
    said summing circuit arranged to sum together the outputs of each of said weighting factor modules and the output of the frequency term module for said first term.

4. The system of claim 3, wherein said weighting factors are normalized to 1 volt.

5. The system of claim 1, wherein said frequency modules are arranged to realize a frequency response H(s) given by:

$$H(s) = \left(\frac{1}{R_0} + A\left[\frac{sC_1}{1+sC_1R_1} + \frac{sC_2}{1+sC_2R_2} + \ldots + \frac{sC_n}{1+sR_nC_n}\right] + A^2\left[\frac{sC_x}{1+R_xC_x}\right]\right)R_s,$$

where A varies with the length of said conductor, each of said frequency modules realizing a respective one of said H(s) term.

6. The system of claim 5, wherein the frequency module realizing the $$A\left[\frac{sC_1}{1+sC_1R_1} + \frac{sC_2}{1+sC_2R_2} + \ldots + \frac{sC_n}{1+sR_nC_n}\right]$$

term of H(s) is arranged to approximate said term with a piece-wise linear sum of n zero-pole pairs.

7. The system of claim 6, wherein n=2.

8. The system of claim 5, wherein the frequency module realizing the $$A^2\left[\frac{sC_x}{1+R_xC_x}\right]$$

term of H(s) is arranged to approximate said term with a single zero-pole pair.

9. The system of claim 1, wherein said signal propagated via said conductor is a differential signal, each of said frequency modules comprising:
 differential input nodes coupled to said differential signal;
 differential output nodes, said frequency module arranged to produce a differential output current at said output nodes which varies with said differential signal; and
 an impedance network arranged to approximate the frequency term of said frequency module's corresponding term in said Taylor series expansion, said frequency module arranged to couple said differential signal across said impedance network to produce said differential output current.

10. The system of claim 9, wherein said impedance network for the frequency module corresponding to the first term in said Taylor series expansion is a resistor.

11. The system of claim 9, wherein said impedance network for the frequency module corresponding to the third term in said Taylor series expansion comprises a capacitor, such that said impedance increases approximately linearly with frequency.

12. The system of claim 9, wherein said impedance network for the frequency module corresponding to the second term in said Taylor series expansion comprises multiple series resistor-capacitor impedances connected in parallel, such that said impedance increases with the square-root of frequency, approximately.

13. The system of claim 9, wherein said frequency modules for terms higher than said first term further comprise respective mixers, each of which receives a voltage which varies with the length of said conductor at an input and is arranged to steer said differential current to a single-ended current output node or to a current discard node in response to said voltage.

14. The system of claim 13, further comprising:
 a summing circuit which sums together the currents steered to said single-ended current output nodes and the differential current provided by said frequency module corresponding to said first term; and
 a buffer amplifier which receives said summed currents and produces a single-ended voltage output.

15. The system of claim 14, wherein said buffer amplifier is a current feedback amplifier.

16. The system of claim 1, said system arranged to receive a user-provided value from which said weighting factor is derived.

17. The system of claim 1, wherein said system is an analog equalizer.

18. A method of providing a compensating frequency response $H^{-1}(f)$ for a conductor having a frequency response $H(f)$ given by $H(f)=e^{-kl(1+j)\sqrt{f}}$, comprising:
 receiving a signal propagated via said conductor;
 computing the terms of a Taylor series expansion of $H^{-1}(f)$; and
 summing said terms together so as to provide a compensating frequency response $H^{-1}(f)$ given by:

$$H^{-1}(f) = 1 + \frac{kl\sqrt{f}}{1!} + \frac{k^2l^2f}{2!} + \frac{k^3l^3f^2}{3!} + \ldots,$$

where k is a constant dependent on the physical parameters of said conductor, l is the length of said conductor and f is the frequency of the signal propagated via said conductor.

* * * * *